(12) United States Patent
Nelson et al.

(10) Patent No.: US 10,494,235 B2
(45) Date of Patent: Dec. 3, 2019

(54) CRANE SYSTEM AND AN ASSOCIATED METHOD THEREOF

(71) Applicant: General Electric Company, Schenectady, NY (US)

(72) Inventors: Garth M Nelson, Ballston Lake, NY (US); Biao Fang, Clifton Park, NY (US); Fulton Jose Lopez, Clifton Park, NY (US); George Albert Goller, Greenville, SC (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 15/369,976

(22) Filed: Dec. 6, 2016

(65) Prior Publication Data

US 2018/0155160 A1 Jun. 7, 2018

(51) Int. Cl.
*B66C 23/20* (2006.01)
*F03D 13/10* (2016.01)

(52) U.S. Cl.
CPC ............ *B66C 23/207* (2013.01); *F03D 13/10* (2016.05); *F05B 2240/916* (2013.01)

(58) Field of Classification Search
CPC ..... B66C 23/185; B66C 23/207; B66C 23/32; B66C 23/64; F03D 13/10; F05B 2240/916
See application file for complete search history.

(56) References Cited

U.S. PATENT DOCUMENTS

| | | |
|---|---|---|
| 2,720,694 A | 10/1955 | Hines |
| 2,754,012 A | 7/1956 | Hines |
| 6,868,646 B1 | 3/2005 | Perina |
| 8,191,878 B2 | 6/2012 | Pedersen et al. |
| 9,850,880 B2 * | 12/2017 | Puls .......................... B66F 3/24 |
| 2003/0183594 A1 | 10/2003 | Torres Martinez |

(Continued)

FOREIGN PATENT DOCUMENTS

| | | |
|---|---|---|
| CN | 201485202 U | 5/2010 |
| CN | 203486790 U | 3/2014 |

(Continued)

OTHER PUBLICATIONS

Sun et al., "Structure Optimum Design based on Maintenance and Lifting Equipment for Wind Turbine", Applied Mechanics & Materials, Issue: 684, 2014, 7 Pages.

*Primary Examiner* — Michael E Gallion

(74) *Attorney, Agent, or Firm* — Dority & Manning, P.A.

(57) ABSTRACT

A crane system for a wind turbine is disclosed. The crane system includes a support structure, a movable structure, a slidable device, a first actuator unit, and a plurality of second actuator units. The slidable device includes a base, a retention component, and first, second, third, and fourth pairs of clamping arms. The base is coupled to the support structure. The retention component is coupled to either side of the base to define a channel between the retention component and the base. The first and second pairs of clamping arms are spaced apart and coupled to each other and to the base. The third and fourth pairs of clamping arms are disposed within the channel, spaced apart, and coupled to each other. The first actuator unit is coupled to the slidable device and each second actuator unit is coupled to the first, second, third, and fourth pairs of clamping arms.

10 Claims, 14 Drawing Sheets

(56) References Cited

U.S. PATENT DOCUMENTS

| | | |
|---|---|---|
| 2008/0203246 A1 | 8/2008 | Ingram et al. |
| 2011/0116864 A1 | 5/2011 | Stokes |
| 2013/0043094 A1 | 2/2013 | Lee |
| 2013/0228397 A1 | 9/2013 | Horn |
| 2015/0158704 A1* | 6/2015 | Giles .................. B66C 13/06 212/273 |
| 2016/0010621 A1 | 1/2016 | Zuteck |

FOREIGN PATENT DOCUMENTS

| | | |
|---|---|---|
| CN | 204281116 U | 4/2015 |
| EP | 1857670 B1 | 7/2011 |
| JE | 19741988 A1 | 4/1999 |

\* cited by examiner

CRANE SYSTEM AND AN ASSOCIATED METHOD THEREOF

BACKGROUND

Embodiments of the present invention relate to crane systems, and more particularly, to a crane system and an associated method for installation and/or repair of a wind turbine.

Wind turbines are used to convert kinetic energy of wind into electrical power. The wind turbine includes a substantially large sized rotor (i.e., wheel) coupled to a nacelle disposed on top end of a tower. The nacelle includes a generator for producing electrical power from a rotary energy produced by the rotor. Typically, installation and/or repair of such wind turbines requires at least one large sized crane system. Such a large sized crane system may need to be robust enough for reaching and lifting heavy loads to considerable heights while installing and/or repairing the wind turbine. The wind turbine may generally extend several meters above ground level or sea level. Typically, such large sized crane systems are scarce and expensive to mobilize at a wind turbine site.

Accordingly, there is a need for a simple and enhanced crane system and an associated method for operating such a crane system for installation and/or repair of a wind turbine.

BRIEF DESCRIPTION

In accordance with one exemplary embodiment of the present invention, a crane system for a wind turbine is disclosed. The crane system includes a support structure, a movable structure, a slidable device, a first actuator unit, and a plurality of second actuator units. The movable structure is coupled to an end of the support structure and configured to move one or more components of the wind turbine. The slidable device includes a base, a retention component, a first pair of clamping arms, a second pair of clamping arms, a third pair of clamping arms, and a fourth pair of clamping arms. The base is coupled to a peripheral side of the support structure. The retention component is coupled to either side of the base to define a channel between the retention component and the base. The first pair of clamping arms and a second pair of clamping arms are spaced apart and coupled to each other and to the base. The third pair of clamping arms and a fourth pair of clamping arms are spaced apart and coupled to each other. The third and fourth pairs of clamping arms are slidably disposed within the channel in an interleaved manner with respect to the first and second pairs of clamping arms. The first actuator unit is coupled to the slidable device and configured to move the slidable device along a longitudinal direction of a tower of the wind turbine. Each second actuator unit is coupled to the first, second, third, and fourth pairs of clamping arms and configured to move the first, second, third, and fourth pairs of clamping arms along a lateral direction of the tower.

In accordance with another exemplary embodiment of the present invention, a method for operating a crane system is disclosed. The method involves moving a slidable device along a longitudinal direction of a tower of a wind turbine via a first actuator unit. The slidable device includes a base, a retention component, a first pair of clamping arms, a second pair of clamping arms, a third pair of clamping arms, and a fourth pair of clamping arms. The base is coupled to a peripheral side of the support structure. The retention component is coupled to either side of the base to define a channel between the retention component and the base. The first pair of clamping arms and a second pair of clamping arms are spaced apart and coupled to each other and to the base. The third pair of clamping arms and a fourth pair of clamping arms are spaced apart and coupled to each other. The third and fourth pairs of clamping arms are slidably disposed within the channel in an interleaved manner with respect to the first and second pairs of clamping arms. The method further involves moving the first, second, third, and fourth pairs of clamping arms along a lateral direction of the tower via a second actuator unit of a plurality of second actuator units. Further, the method involves clamping at least two pairs of the first, second, third, and fourth pairs of clamping arms to the tower.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a crane system for installation or repair of a wind turbine. The exemplary crane system is configured to move along a tower/tower portions of the wind turbine to install and/or repair one or more components of the wind turbine. The one or more components of the wind turbine may include a nacelle, a rotor assembly, one or more segments of the tower, and the like. In one embodiment, the crane system includes a slidable device configured to move along a concrete tower. In another embodiment, the slidable device is configured to move along a steel tower. The tower may be provided with a plurality of projections or a plurality of grooves to assist the slidable device to grip against the tower and avoid slippage of the crane system. In some embodiments, the slidable device is configured to move along a combination of steel and concrete tower portions. In some other embodiments, the slidable device may be configured to move along a longitudinally segmented tower. In some other embodiments, the slidable device may be configured to move along a circumferentially and longitudinally segmented tower.

In one or more embodiments, the crane system includes a support structure, a movable structure, a slidable device, a first actuator unit, and a plurality of second actuator units. The movable structure is coupled to an end of the support structure and configured to move one or more components of a wind turbine. The slidable device includes a base, a retention component, a first pair of clamping arms, a second pair of clamping arms, a third pair of clamping arms, and a fourth pair of clamping arms. The base is coupled to a peripheral side of the support structure. The retention component is coupled to either side of the base to define a channel between the retention component and the base. The first pair of clamping arms and a second pair of clamping arms are spaced apart and coupled to each other and to the base. The third pair of clamping arms and a fourth pair of clamping arms are spaced apart and coupled to each other. The third and fourth pairs of clamping arms are slidably disposed within the channel in an interleaved manner with respect to the first and second pairs of clamping arms. The first actuator unit is coupled to the slidable device and configured to move the slidable device along a longitudinal direction of the tower. Each second actuator unit is coupled to the first, second, third, and fourth pairs of clamping arms and configured to move the first, second, third, and fourth pairs of clamping arms along a lateral direction of the tower. It should be noted herein that the number of pairs of clamping arms may vary depending on the application and requirements.

Figure 1:
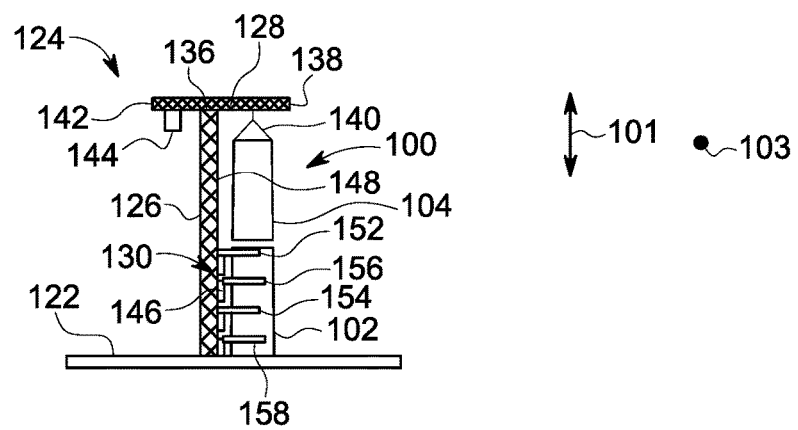
FIG. 1 is a schematic side view of an exemplary crane system used for installation of a tower of a wind turbine in accordance with one exemplary embodiment.

FIG. 1 illustrates a schematic side view of a crane system 124 used for installation of a tower 100 of a wind turbine in accordance with one exemplary embodiment. In one embodiment, the tower 100 is a steel tower. In some other embodiments, the tower 100 may be a concrete tower. In some other embodiments, the tower 100 may be a combination of steel and concrete tower portions. In the illustrated embodiment, the tower 100 includes a base segment 102 affixed to a surface 122 of earth via a suitable coupling mechanism In some embodiments, the surface 122 may be a terrain of the earth. In some other embodiments, the surface 122 may be a bed located several meters below sea.

In one exemplary embodiment, the base segment 102 may have a height of about 20 meters extending along a longitudinal direction 101 of the wind turbine. The base segment 102 may have a cylindrical profile. The tower 100 further includes a first segment 104, which is installed over the base segment 102, using the crane system 124. In such an embodiment, the crane system 124 includes a support structure 126, a movable structure 128, a slidable device 130, a first actuator unit, and a plurality of second actuator units (not shown in FIG. 1).

The support structure 126 is a vertical support structure of the crane system 124. In certain embodiments, the support structure 126 is made of steel trussed sections that are connected to each other. In one exemplary embodiment, the support structure 126 may have a height of about 40 meters extending along the longitudinal direction 101.

The movable structure 128 is coupled to a top end 136 of the support structure 126. The movable structure 128 is a horizontal support structure of the crane system 124 configured to move the one or more components of the wind turbine. The movable structure 128 is configured to rotate, tilt, and extend relative to the support structure 126. In certain embodiments, the movable structure 128 is made of steel trussed sections that are connected to each other. In the illustrated embodiment, the movable structure 128 includes a front end 138 having a hook 140 and a rear end 142 having counterweights 144. In the illustrated embodiment, the hook 140 is configured to hold, lift, and lower one or more components of the tower 100.

The slidable device 130 includes a base 146 coupled to a peripheral side 148 of the support structure 126. In the illustrated embodiment, the slidable device 130 further includes a first pair of clamping arms 152, a second pair of clamping arms 154, a third pair of clamping arms 156, and a fourth pair of clamping arms 158. It should be noted herein that only one clamping arm of each of the first, second, third, and fourth pairs of clamping arms 152, 154, 156, 158 is shown in FIG. 1. The first and second pairs of clamping arms 152, 154 are spaced apart and coupled to each other and to the base 146. The third and fourth pairs of clamping arms 156, 158 are spaced apart and coupled to each other. Further, the third and fourth pairs of clamping arms 156, 158 are disposed in an interleaved manner with respect to the first and second pairs of clamping arms 152, 154.

During operation, the first, second, third, and fourth pairs of clamping arms 152, 154, 156, 158 are configured to move along a lateral direction 103 to clamp the first, second, third, and fourth pairs of clamping arms 152, 154, 156, 158 to the tower 100 or segments of the tower 100. In one embodiment, the hook 140 is configured to hold the first segment 104, lift the first segment 104, and dispose the first segment 104 over the base segment 102. In such an embodiment, the movable structure 128 may be driven by one or more drive units, for example, a hydraulic ram or a pneumatic ram (not shown). Further, the first segment 104 is coupled to the base segment 102, using a coupling mechanism.

Figure 2:
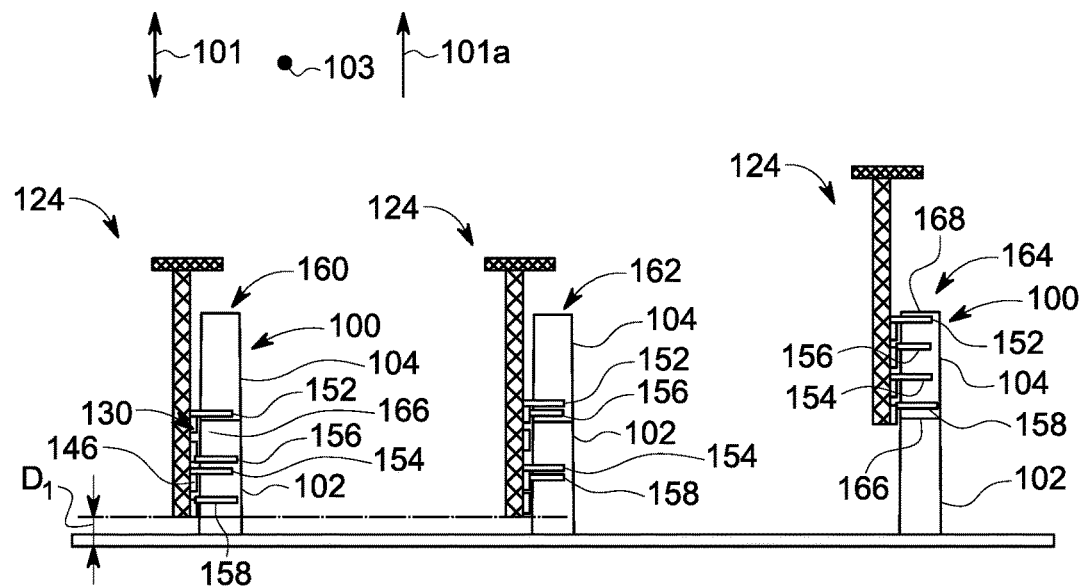
FIG. 2 is a schematic side view of the crane system configured to move along the tower in accordance with the exemplary embodiment of FIG. 1.

FIG. 2 illustrates a schematic side view of the crane system 124 configured to move along the tower 100 in accordance with the exemplary embodiment of FIG. 1. In the illustrated embodiment, movement of the slidable device 130 of the crane system 124 is shown in three stages 160, 162, 164. It should be noted herein that three stages are shown for ease of illustration and such an illustration should not be construed as a limitation of the present invention.

At stage 160, the first and second pairs of the clamping arms 152, 154 are configured to unclamp from the base segment 102 while the third and fourth pairs of clamping arms 156, 158 are clamped to the base segment 102. The first and second pairs of clamping arms 152, 154 are configured to move along a first longitudinal direction 101a of the tower 100. In the illustrated embodiment, the slidable device 130 is configured to sequentially move from the base segment 102 to the first segment 104 of the tower 100. In the illustrated embodiment, at an end of the stage 160, the crane system 124 is configured to move a distance "$D_1$" along the first longitudinal direction 101a.

At stage 162, the first and second pairs of clamping arms 152, 154 are configured to move along the lateral direction 103 to clamp to the first segment 104 and the third and fourth pairs of the clamping arms 156, 158 are configured to move along the lateral direction 103 to unclamp from the base segment 102. Subsequently, the third and fourth pairs of clamping arms 156, 158 are configured to slide along the first longitudinal direction 101a while the first and second pairs of clamping arms 152, 154 are configured to clamp to the first segment 104. In the illustrated embodiment, at an end of the stage 162, the crane system 124 is retained at distance "$D_1$", while the third and fourth pairs of clamping arms 156, 158 reset their respective position for subsequent movement of the slidable device 130 along the tower 100.

At stage 164, the crane system 124 is configured to move from a top end 166 of the base segment 102 to a top end 168 of the first segment 104. Specifically, at end of stage 164, the first pair of clamping arms 152 is positioned proximate to the top end 168 of the first segment 104 and the fourth pair of clamping arms 158 are disposed proximate to the top end 166 of the base segment 102.

Figure 3:
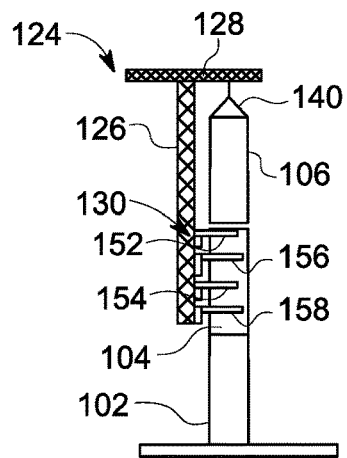
FIG. 3 is a schematic side view of the crane system used for installation of the tower of the wind turbine in accordance with the exemplary embodiments of FIGS. 1-2.
Figure 4:
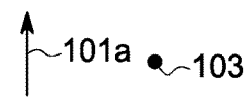
FIG. 4 is a schematic side view of the crane system used for installation of the tower of the wind turbine in accordance with the exemplary embodiments of FIGS. 1-3.
Figure 4:
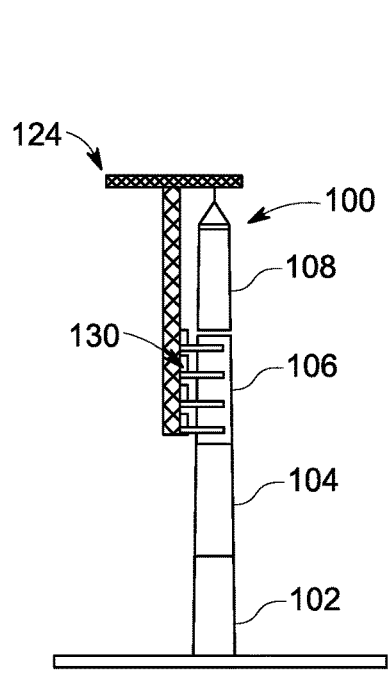
Figure 5:
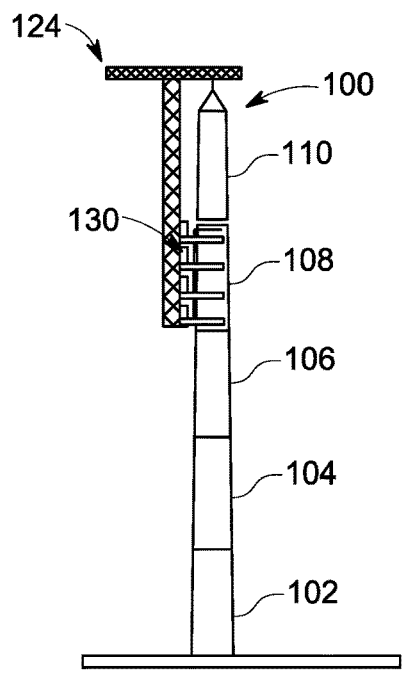
FIG. 5 is a schematic side view of the crane system used for installation of the tower in accordance with the exemplary embodiments of FIGS. 1-4.
Figure 6:
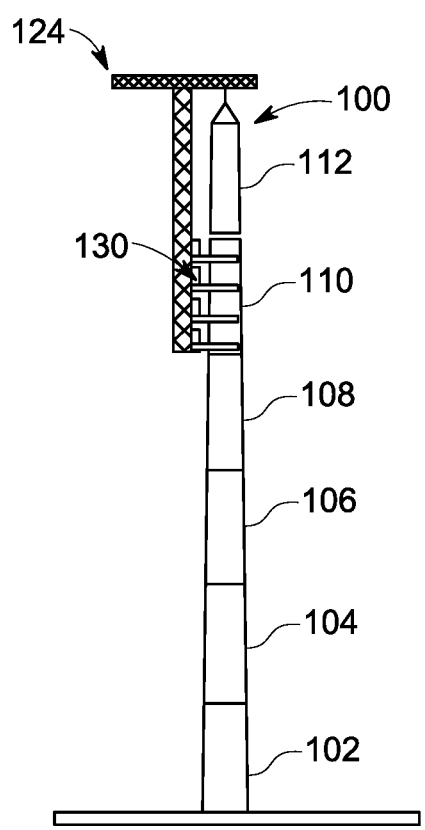
FIG. 6 is a schematic side view of the crane system used for installation of the tower of the wind turbine in accordance with the exemplary embodiments of FIGS. 1-5.
Figure 7:
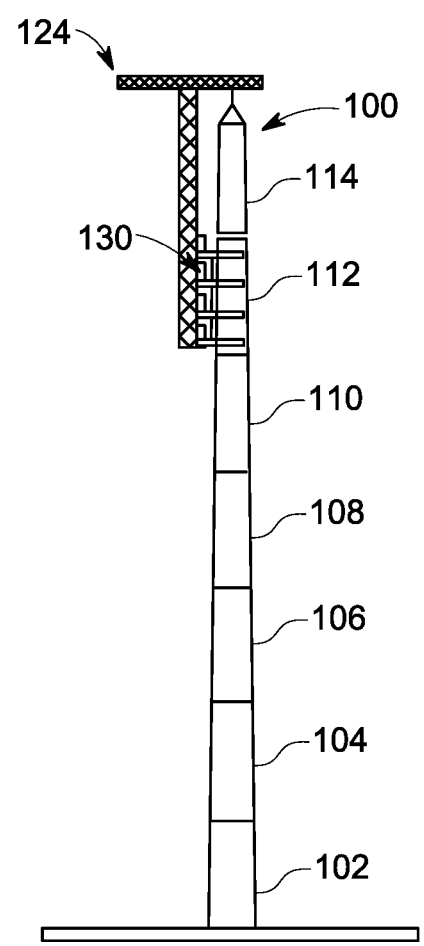
FIG. 7 is a schematic side view of the crane system used for installation of the tower of the wind turbine in accordance with the exemplary embodiments of FIGS. 1-6.
Figure 8:
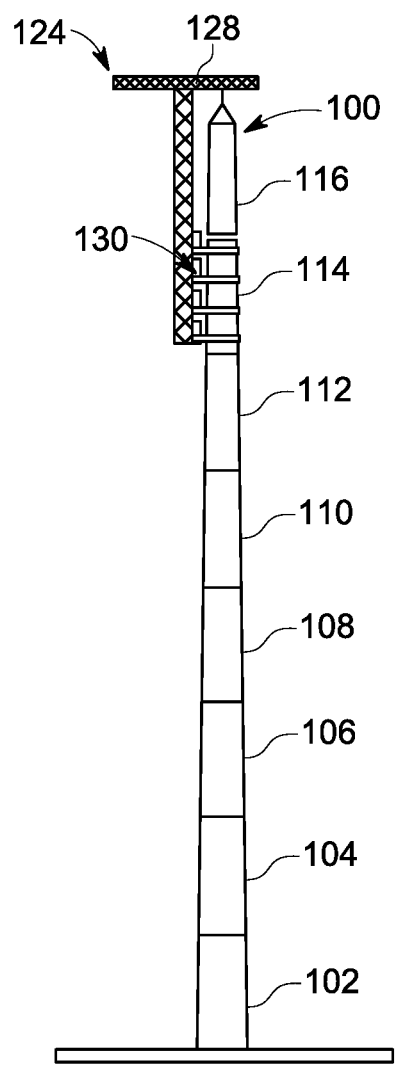
FIG. 8 is a schematic side view of the crane system used of the tower of the wind turbine in accordance with the exemplary embodiments of FIGS. 1-7.

FIG. 3 illustrates a schematic side view of the crane system 124 used for installation of the tower 100 in accordance with the exemplary embodiments of FIGS. 1-2. During installation of a second segment 106 of the tower 100, the first, second, third, and fourth pairs of clamping arms 152, 154, 156, 158 are configured to move along the lateral direction 103 to clamp to the first segment 104. The hook 140 of the movable structure 128 is configured to hold the second segment 106, lift the second segment 106, and then dispose the second segment 106 over the first segment 104. Subsequently, the second segment 106 is coupled to the first segment 104.

FIGS. 4-8 illustrates a schematic side view of the crane system 124 used for installation of the third segment 108, fourth segment 110, fifth segment 112, sixth segment 114, and seventh segment 116 of the tower 100 respectively in accordance with the exemplary embodiments of FIGS. 1-3. During installation of the respective third, fourth, fifth, sixth, and seventh segment 108, 110, 112, 114, 116, the slidable device 130 is configured to move the crane system 124 along the first longitudinal direction 101a. The first, second, third, and fourth pairs of clamping arms 152, 154, 156, 158 are configured to move along the lateral direction 103 to either clamp to or unclamp from respective segments of the tower 100 as discussed similarly in FIGS. 2-3. The movable structure 128 is configured to dispose the respective third, fourth, fifth, sixth, and seventh segments 108, 110, 112, 114, 116, to complete the installation of the tower 100. In one embodiment, the tower 100 may have a height of at least 160 meters.

Figure 9:
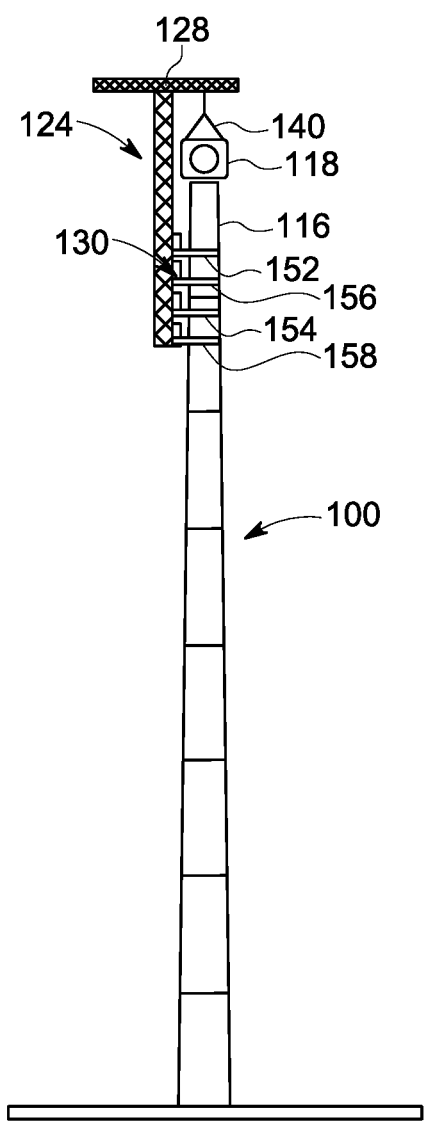
FIG. 9 is a schematic side view of the crane system used for installation of a nacelle of the wind turbine in accordance with the exemplary embodiments of FIGS. 1-8.

FIG. 9 illustrates a schematic side view of the crane system 124 used for installation of a nacelle 118 of the wind turbine on the seventh segment 116 of the tower 100 in accordance with the exemplary embodiments of FIGS. 1-8. The first, second, third, and fourth pairs of clamping arms 152, 154, 156, 158 are configured to move along the lateral direction 103 to clamp the slidable device 130 to the tower 100. The movable structure 128 is configured to hold the nacelle 118, lift the nacelle 118, and dispose the nacelle 118 over the seventh segment, 116 using the hook 140.

Figure 10:
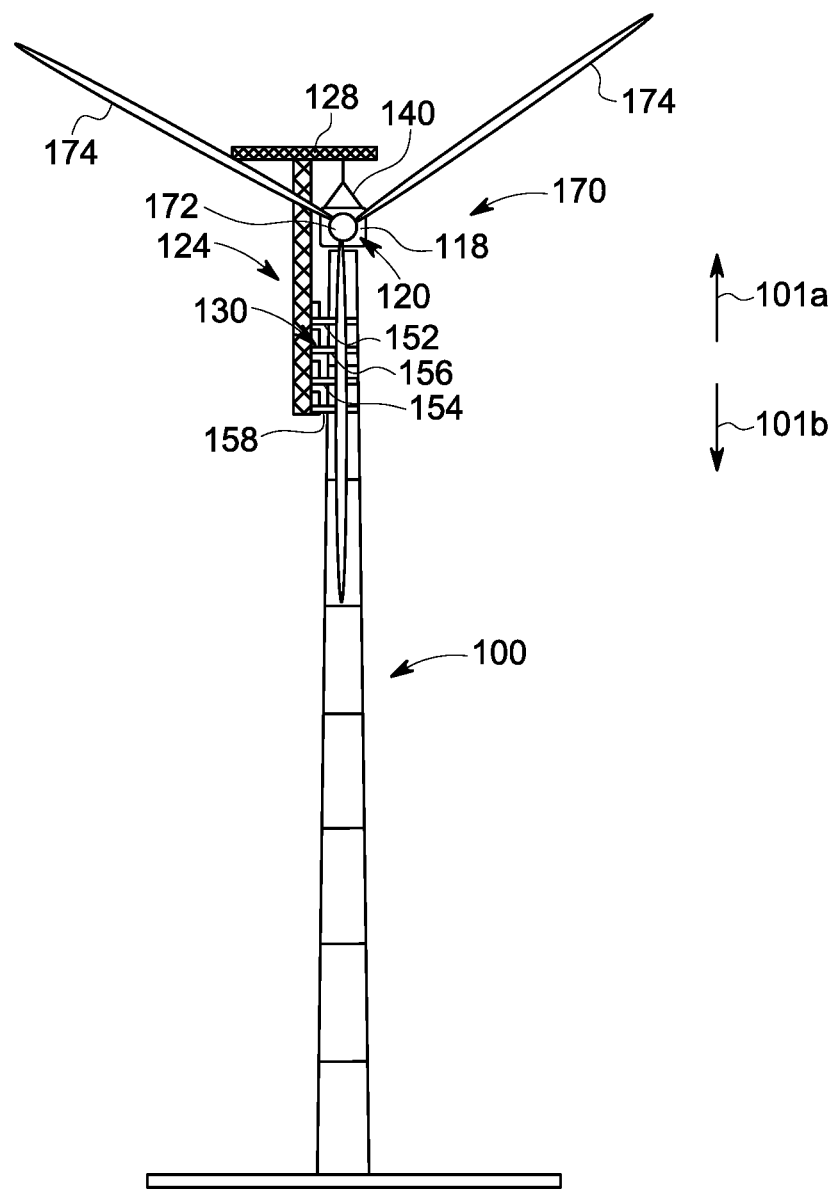
FIG. 10 is a schematic side view of installation of the crane system used for installation of a rotor assembly of the wind turbine on the nacelle in accordance with the exemplary embodiments of FIGS. 1-9.

FIG. 10 illustrates a schematic side view of installation of a rotor assembly 120 to the nacelle 118 to form a wind turbine 170, using the crane system 124 in accordance with the exemplary embodiments of FIGS. 1-8. The movable structure 128 is configured to hold the rotor assembly 120, lift the rotor assembly 120, and dispose the rotor assembly 120 on the nacelle 118, using the hook 140. Subsequently, the rotor assembly 120 is coupled to the nacelle 118. In certain embodiments, the rotor assembly 120 include a hub 172 and a plurality of rotor blades 174 coupled to the hub 172. The hub 172 is further coupled to a shaft (not shown) of the nacelle 118 to drive the generator.

In certain embodiments, the crane system 124 is configured to move along a second longitudinal direction 101b opposite to the first longitudinal direction 101a of the tower 100. In certain embodiments, the crane system 124 may be used to move along the tower 100 during repair/maintenance of one or more components of the wind turbine 170.

Figure 11:
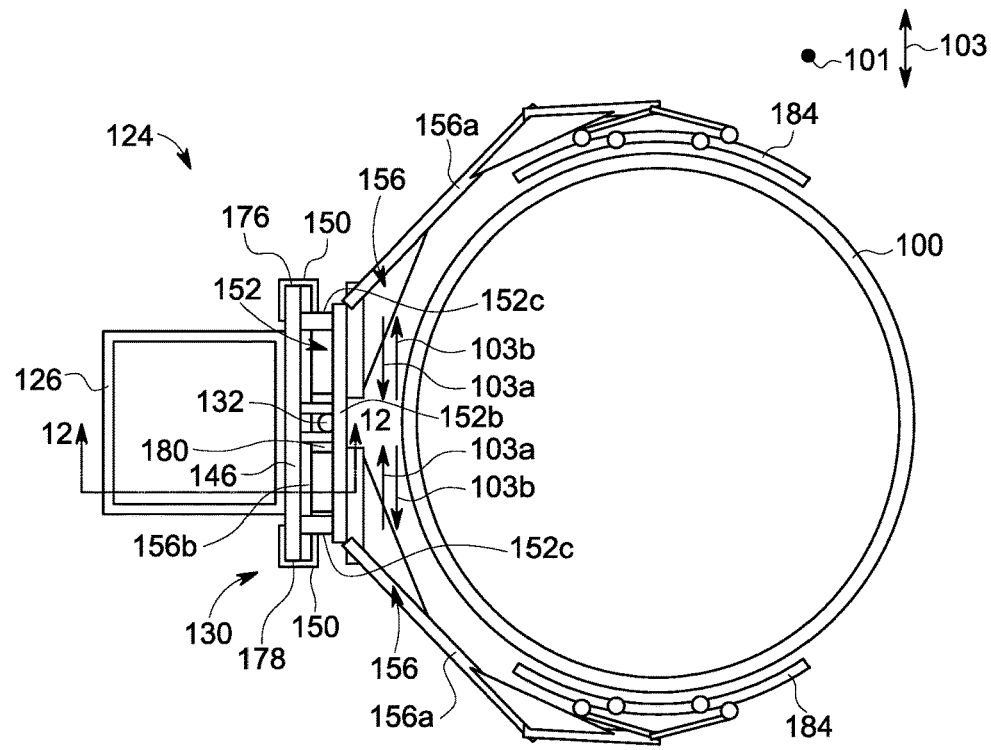
FIG. 11 is a schematic top view of a portion of a crane system and a tower in accordance with one exemplary embodiment.

FIG. 11 illustrates a schematic top view of a portion of the crane system 124 and the tower 100 in accordance with one exemplary embodiment. In the illustrated embodiment, the crane system 124 includes the support structure 126, the slidable device 130, and a first actuator unit 132. Further, the slidable device 130 includes the base 146, a retention component 150, the first pair of clamping arms 152, the second pair of clamping arms, the third pair of clamping arms 156, and the fourth pair of clamping arms. It should be noted herein that in the illustrated embodiment, only a portion of the first pair of clamping arms 152 is shown for ease of illustration. Further, in the illustrated embodiment, the second pair of clamping arms and the fourth pair of clamping arms are not shown for ease of illustration. In one embodiment, the base 146 is coupled to the support structure 126. In the illustrated embodiment, the retention component 150 includes a pair of retention brackets. The pair of retention brackets is coupled respectively to either side 176, 178 of the base 146 to define a channel 180 between the pair of retention brackets and the base 146. In some embodiments, the retention component 150 may include a retention tube coupled to the either side 176, 178 of the base 146. In some other embodiments, the retention component 150 may be an integral component extending from the either side 176, 178 of the base 146. In one embodiment, the retention component 150 is a component extending continuously along a longitudinal direction of the base 146. In certain embodiments, the retention component 150 may include a plurality of discrete retention components spaced apart from each other along the longitudinal direction 101 and coupled to the base 146.

The first pair of clamping arms 152 includes a first pair of clamping members 152a (shown in FIG. 13), a first connecting member 152b, and a plurality of first spacers 152c. The first connecting member 152b is coupled to the base 146 via the plurality of first spacers 152c. In certain embodiments, the first pair of clamping members (which is similar to clamping members 156a shown in FIG. 11) extends outwardly from the first connecting member 152b towards the tower 100. Each clamping member of the first pair of clamping members includes a tower contacting portion configured to clamp and unclamp from the tower 100.

The second pair of clamping arms is substantially similar to the first pair of clamping arms 152. The second pair of clamping arms includes a second pair of clamping members, a second connecting member, and a plurality of second spacers. The second connecting member is coupled to the base 146 via the plurality of second spacers. In certain embodiments, the second pair of clamping members (which is similar to the clamping members 156a shown in FIG. 11) extends outwardly from the second connecting member towards the tower 100. In such an embodiment, each clamping member of the second pair of clamping members includes a tower contacting portion configured to clamp and unclamp from the tower 100.

The third pair of clamping arms 156 is disposed below the first pair of clamping arms 152. Specifically, the third pair of clamping arms 156 is slidably disposed within the channel 180 in an interleaved manner with respect to the first pair of clamping arms 152 and the second pair of clamping arms. For example, in one embodiment, the third pair of clamping arms 156 is disposed between the first and second pairs of clamping arms, while the fourth pair of clamping arms is disposed below the second pair of clamping arms. The third pair of clamping arms 156 includes a third pair of clamping members 156a and a third connecting member 156b. In such an embodiment, each of the third pair of clamping members 156a includes a tower contacting portion 184 configured to clamp the tower 100. The first actuator unit 132 is coupled to the slidable device 130 and configured to move the slidable device 130 along the longitudinal direction 101 of the tower 100. In the illustrated embodiment, the first actuator unit 132 is coupled to the first connecting member 152b and the third connecting member 156b. In one embodiment, the first actuator unit 132 is a hydraulic ram. In some other embodiments, the first actuator unit 132 may be a pneumatic ram.

The fourth pair of clamping arms is substantially similar to the third pair of clamping arms 156. The fourth pair of clamping arms is disposed below the second pair of clamping arms. Specifically, the fourth pair of clamping arms is interconnected to the third pair of clamping arms 156 via a coupling member 186 (shown in FIG. 12) and the assembly is slidably disposed within the channel 180 in the interleaved manner with respect to the first pair of clamping arms 152 and the second pair of clamping arms. The fourth pair of clamping arms includes a fourth pair of clamping members and a fourth connecting member. In certain embodiments, the fourth pair of clamping members (which is similar to the clamping members 156a shown in FIG. 11) extends outwardly from the fourth connecting member towards the tower 100. In such an embodiment, each clamping member of the fourth pair of clamping members includes a tower contacting portion configured to clamp and unclamp from the tower 100.

During operation, the first actuator unit 132 is configured to sequentially move the first pair of clamping arms 152 and the third pair of clamping arms 156 along the longitudinal direction 101. The movement of the first pair of clamping arms 152 results in movement of the second pair of clamping arms since the first pair of clamping arms 152 and the second pair of clamping arms are coupled to each other and to the base 146. In other words, the first pair of clamping arms 152 and the second pair of clamping arms move in tandem, thereby resulting in movement of the slidable device 130 along the longitudinal direction 101. Similarly, the movement of third pair of clamping arms results in movement of the fourth pair of clamping arms since the third pair of clamping arms 156 and the fourth pair of clamping arms are coupled to each other. In other words, the third pair of clamping arms 156 and the fourth pair of clamping arms move in tandem. In the illustrated embodiment, each of the third pair of clamping members 156a is configured to move the tower contacting portion 184 along the lateral direction 103 to clamp the tower 100. Specifically, each of the third pair of clamping members 156a moves along a first lateral direction 103a to clamp the tower contacting portion 184 to the tower 100. Similarly, each of the third pair of clamping members 156a moves along a second lateral direction 103b opposite to the first lateral direction 103a to unclamp the tower contacting portion 184 from the tower 100.

Figure 12:
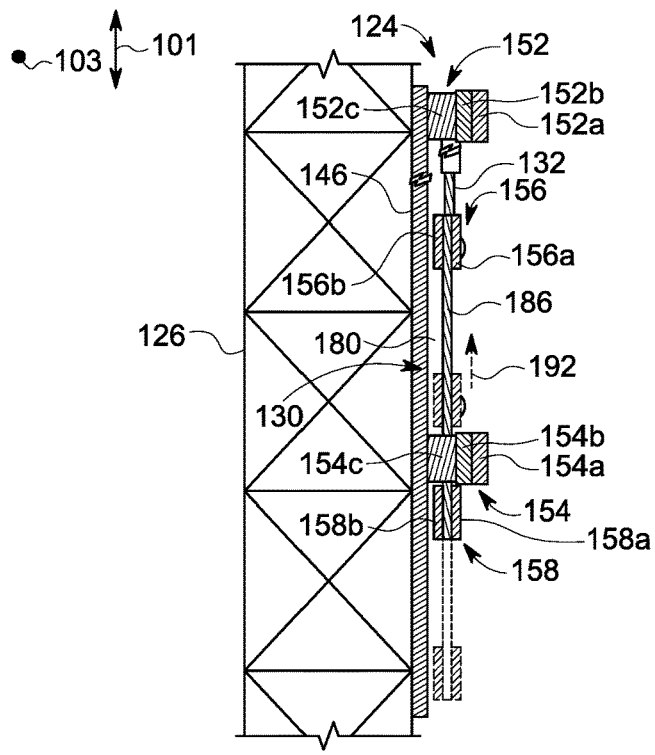
FIG. 12 is a schematic cross-sectional side view of the crane system taken along line 12-12 of FIG. 11 in accordance with one exemplary embodiment.

FIG. 12 illustrates a schematic cross-sectional side view of the crane system 124 taken along line 12-12 of FIG. 11 in accordance with one exemplary embodiment. In the illustrated embodiment, the slidable device 130 includes the base 146, the first, second, third, and fourth pair of clamping arms 152, 154, 156, 158, and the first actuator unit 132. It should be noted herein that in the illustrated embodiment, only one clamping arm of each of the first, second, third, and fourth pairs of clamping arms 152, 154, 156, 158 is shown. The third and fourth pairs of clamping arms 156, 158 are disposed to slide within the channel 180 in an interleaved manner with respect to the first and second pairs of clamping arms 152, 154.

As noted earlier, the first and second pairs of clamping arms 152, 154 are coupled to the base 146 and to each other via the base 146. The third and fourth pairs of clamping arms 156, 158 are coupled to each other via a coupling member 186. In the illustrated embodiment, the first pair of clamping arms 152 includes the first pair of clamping members 152a, the first connecting member 152b, and the plurality of first spacers 152c. The first connecting member 152b is coupled to the base 146 via the plurality of first spacers 152c. The first pair of clamping members 152a extends from the first connecting member 152b towards the tower. Similarly, the second pair of clamping arms 154 includes a second pair of clamping members 154a, a second connecting member 154b, and a plurality of second spacers 154c. The second connecting member 154b is coupled to the base 146 via the plurality of second spacers 154c. The second pair of clamping members 154a extends from the second connecting member 154b towards the tower.

The third pair of clamping arms 156 includes the third pair of clamping members 156a and the third connecting member 156b. Similarly, the fourth pair of clamping arms 158 includes a fourth pair of clamping members 158a and a fourth connecting member 158b. The third connecting member 156b is coupled to the fourth connecting member 158b via the coupling member 186. The third connecting member 156b and the fourth connecting member 158b are positioned to slide longitudinally inside the retention component 150 and within the channel 180. The first actuator unit 132 is coupled to the first connecting member 152b and the third connecting member 156b.

Figure 13:
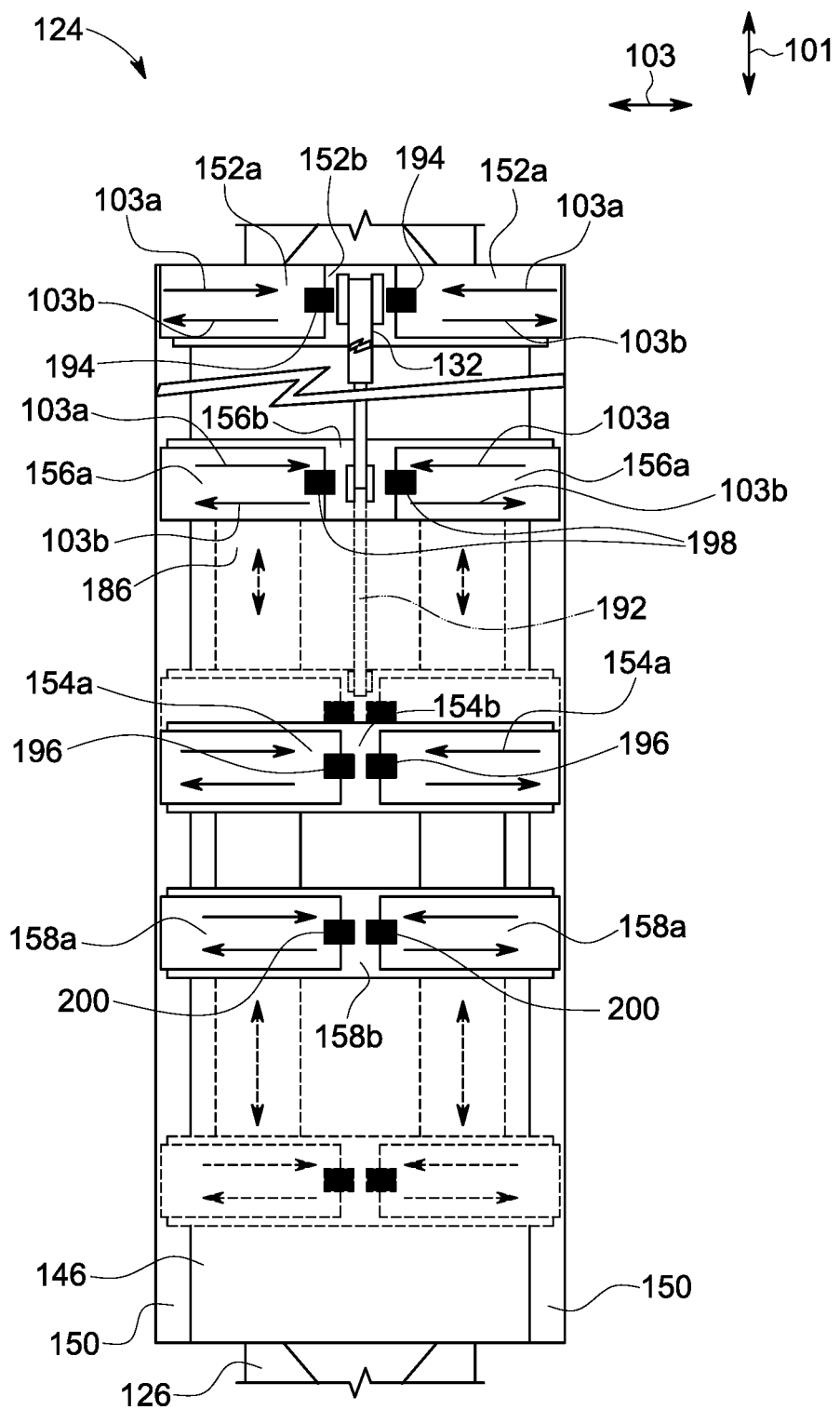
FIG. 13 is a schematic front view of a portion of a crane system in accordance with one exemplary embodiment.

FIG. 13 illustrates a schematic front view of a portion of a crane system 124 in accordance with one exemplary embodiment. In the illustrated embodiment, the crane system 124 further includes a plurality of second actuator units 194, 196, 198, 200. The second actuator unit 194 is coupled to each of the first pair of clamping members 152a and the first connecting member 152b. Similarly, the second actuator unit 196 is coupled to each of the second pair of clamping members 154a and the second connecting member 154b. During operation, the plurality of second actuator units 194, 196 moves the first pair of clamping members 152a and the second pair of clamping members 154a respectively along the first lateral direction 103a to clamp the tower. Similarly, the plurality of second actuator units 194, 196 moves the first pair of clamping members 152a and the second pair of clamping members 154a respectively along the second lateral direction 103b to unclamp from the tower.

The second actuator units 198 is coupled to each of the third pair of clamping members 156a and the third connecting member 156b. Similarly, the second actuator unit 200 is coupled to each of the second pair of clamping members 158a and the fourth connecting member 158b. During operation, the plurality of second actuator units 198, 200 moves the third pair of clamping members 156a and the fourth pair of clamping members 158a respectively along the first lateral direction 103a to clamp the tower. Similarly, the plurality of second actuator units 198, 200 moves the third pair of clamping members 156a and the fourth pair of clamping members 158a respectively along the second lateral direction 103b to unclamp from the tower.

Figure 14:
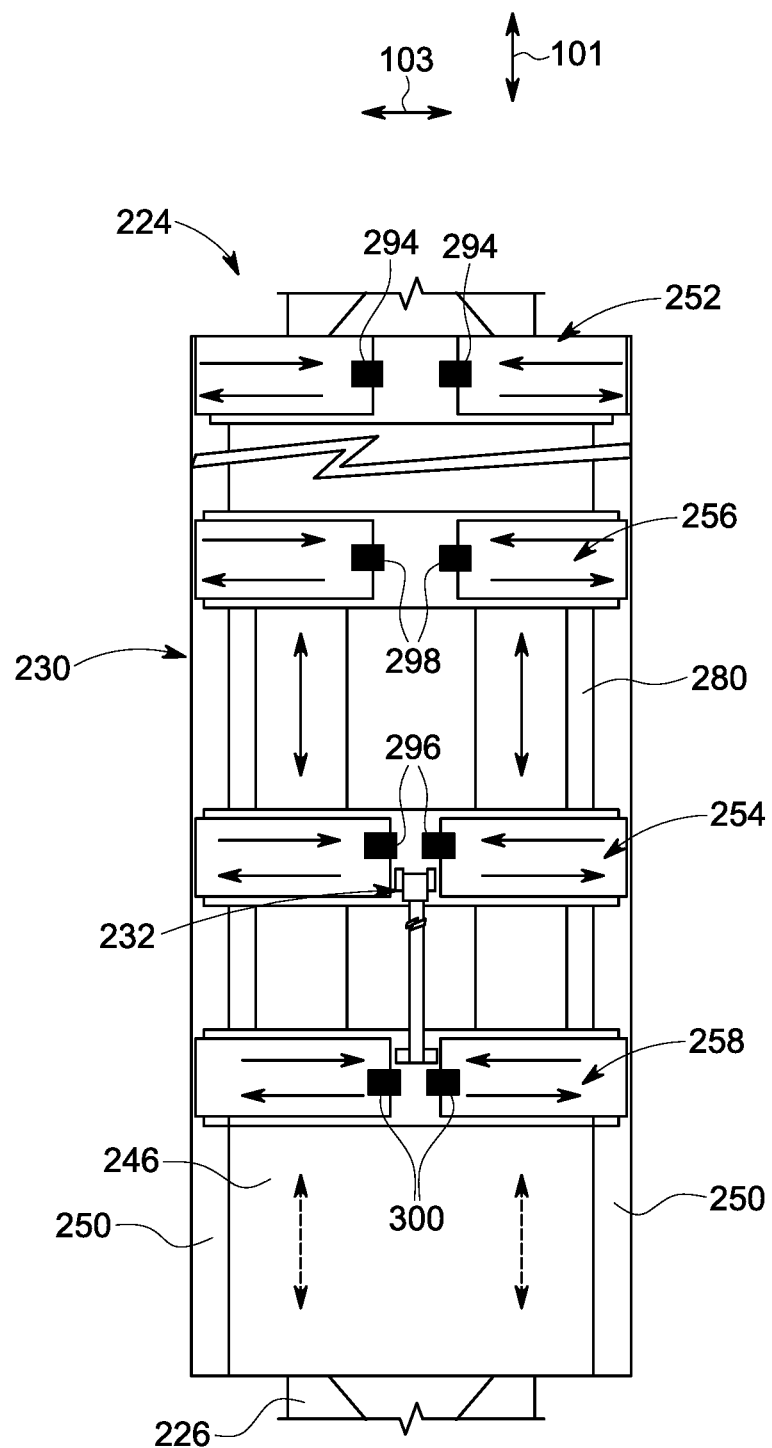
FIG. 14 is a schematic front view of a portion of a crane system in accordance with another exemplary embodiment.

FIG. 14 illustrates a schematic front view of a portion of a crane system 224 in accordance with another exemplary embodiment. Similar to the embodiment of FIGS. 1-13, the crane system 224 includes a support structure 226, a slidable device 230, a first actuator unit 232, and a plurality of second actuator units 294, 296, 298, 300. The slidable device 230 includes a base 246, a pair of retention brackets 250, and a first, second, third, and fourth pairs of clamping arms 252, 254, 256, 258.

The base 246 is coupled to the support structure 226 of the crane system 224. The pair of retention brackets 250 is coupled respectively to either side of the base 246 to define a channel 280 between the pair of retention brackets 250 and the base 246. The first pair of clamping arms 252 and the second pair of clamping arms 254 are spaced apart and coupled to each other and the base 246. The third pair of clamping arms 256 and the fourth pair of clamping arms 258 are spaced apart and coupled to each other. The third and fourth pairs of clamping arms 256, 258 are disposed to slide within the channel 280 in an interleaved manner with respect to the first and second pairs of clamping arms 252, 254. The first actuator unit 232 is coupled to the slidable device 230 and configured to move the slidable device 230 along a longitudinal direction 101 of a tower of a wind turbine. Specifically, in the illustrated embodiment, the first actuator unit 232 is coupled to the second pair of clamping arms 254 and the fourth pair of clamping arms 258. The plurality of second actuator units 294, 296, 298, 300 is coupled to the first, second, third, and fourth pairs of clamping arms 252, 254, 256, 258 respectively and configured to move the first, second, third, and fourth pairs of clamping arms 252, 254, 256, 258 respectively along a lateral direction 103 of the tower to either clamp the tower or unclamp from the tower.

Figure 15:
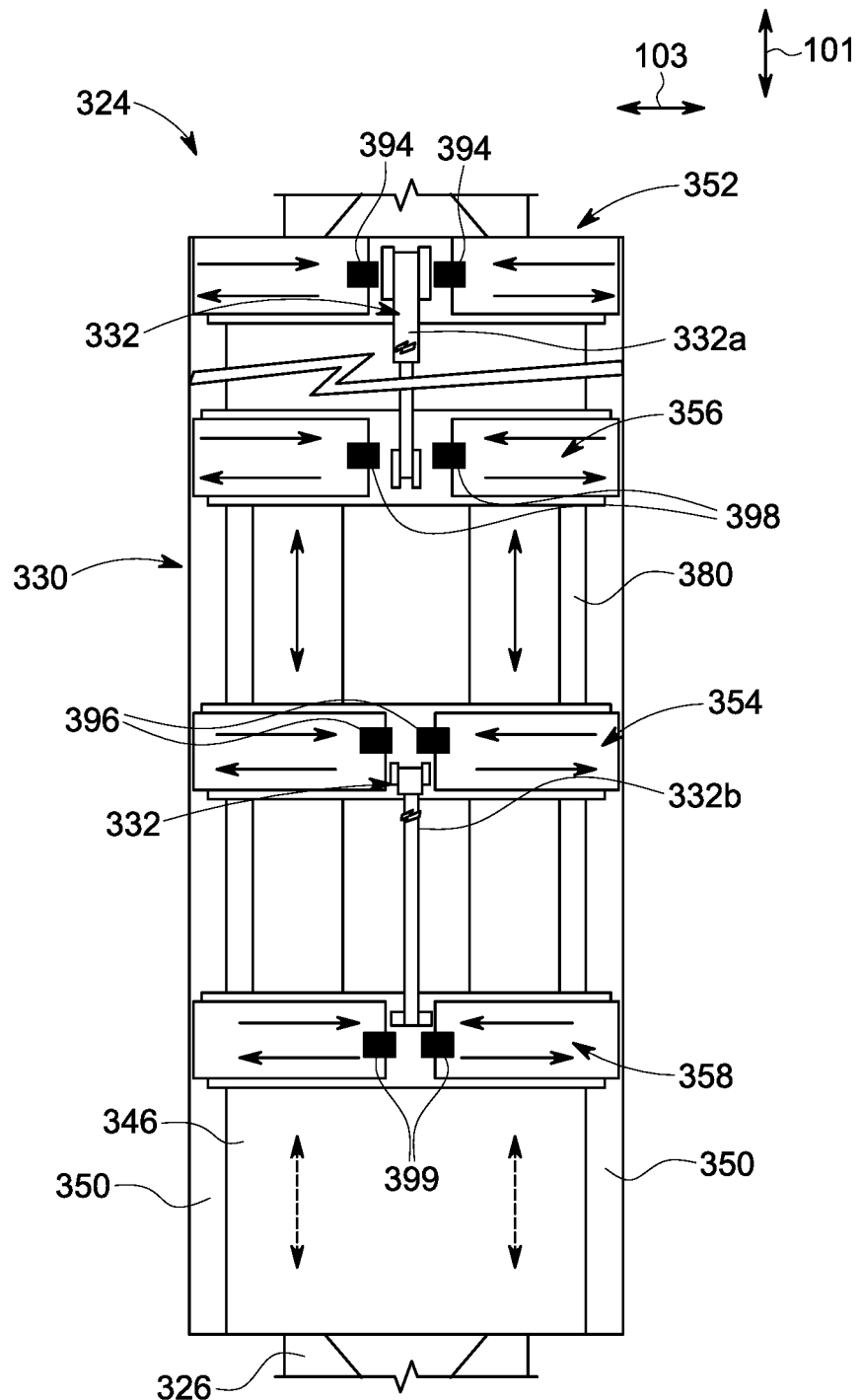
FIG. 15 is a schematic front view of a portion of a crane system in accordance with yet another exemplary embodiment.

FIG. 15 illustrates a schematic front view of a portion of a crane system 324 in accordance with yet another exemplary embodiment. Similar to the embodiment of FIGS. 1-13, the crane system 324 includes a support structure 326, a slidable device 330, a first actuator unit 332, and a plurality of second actuator units 394, 396, 398, 399. The slidable device 330 includes a base 346, a pair of retention brackets 350, and first, second, third, and fourth pairs of clamping arms 352, 354, 356, 358.

The base 346 is coupled to the support structure 326 of the crane system 324. The pair of retention brackets 350 is coupled respectively to either side of the base 346 to define a channel 380 between the pair of retention brackets 350 and the base 346. The first pair of clamping arms 352 and the second pair of clamping arms 354 are spaced apart and coupled to each other and the base 346. The third pair of clamping arms 356 and the fourth pair of clamping arms 358 are spaced apart and coupled to each other. The third and fourth pairs of clamping arms 356, 358 are disposed to slide within the channel 380 in an interleaved manner with respect to the first and second pairs of clamping arms 352, 354. The first actuator unit 332 is coupled to the slidable device 330 and configured to move the slidable device 330 along a longitudinal direction 101 of a tower of a wind turbine. Specifically, in the illustrated embodiment, the first actuator unit 332 includes first sub-actuator unit 332a and a second sub-actuator unit 332b. The first sub-actuator unit 332a is coupled to the first pair of clamping arms 352 and the third pair of clamping arms 356. The second sub-actuator unit 332b is coupled to the second pair of clamping arms 354 and the fourth pair of clamping arms 358. The plurality of second actuator units 394, 396, 398, 399 is coupled to the first, second, third, and fourth pairs of clamping arms 352, 354, 356, 358 respectively and configured to move the first, second, third, and fourth pairs of clamping arms 352 respectively along a lateral direction 103 of the tower to either clamp or unclamp from the tower.

Figure 16:
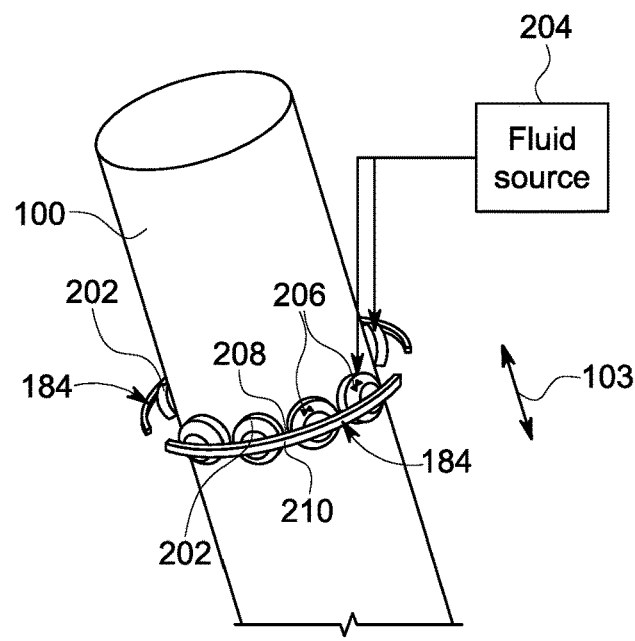
FIG. 16 is a perspective side view of tower contacting portions of one pair of clamping arms of a crane system and a portion of a tower in accordance with one exemplary embodiment.

FIG. 16 illustrates a perspective side view of tower contacting portions 184 of third pair of clamping arms 156 in accordance with the exemplary embodiment of FIG. 11. It should be noted herein that tower contacting portions 184 of only one pair of clamping arms are shown for ease of illustration. In the illustrated embodiment, the crane system 124 further includes a plurality of discrete inflatable elements 202, a fluid source 204, and a fluid releasing device 206. In certain embodiments, the plurality of discrete inflatable elements 202 is made of polyurethane, hypalon, or rubber material. In one embodiment, each tower contacting portion 184 includes an inner surface 208 coupled to the plurality of discrete inflatable elements 202 and an outer surface 210 coupled to the third pair of clamping members 156a. The plurality of discrete inflatable elements 202 is coupled to the fluid source 204 and the fluid releasing device 206. In certain embodiments, the fluid source 204 may be a compressor and the fluid releasing device 206 may be a valve.

During operation, the third pair of clamping members 156a is configured to move each tower contacting portion 184 along a lateral direction 103 to clamp each tower contacting portion 184 to the tower 100. In such an embodiment, the fluid source 204 is configured to supply a fluid to the plurality of discrete inflatable elements 202 to inflate the plurality of discrete inflatable elements and thereby clamp each tower contacting portion 184 against the tower 100. Further, the fluid releasing device 206 is configured to release the fluid from the plurality of discrete inflatable elements 202 to deflate the plurality of discrete inflatable elements and thereby unclamp each tower contacting portion 184 from the tower 100.

Figure 17:
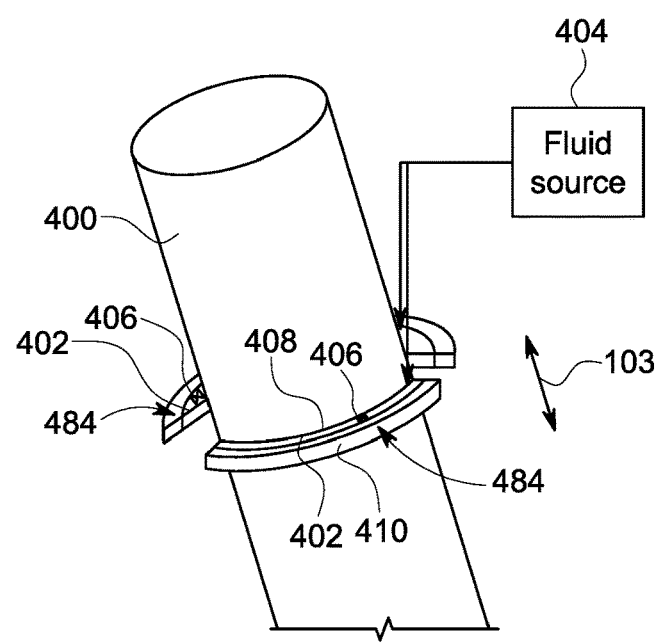
FIG. 17 is a perspective side view of tower contacting portions of one pair of clamping arms of a crane system and a portion of a tower in accordance with another exemplary embodiment.

FIG. 17 illustrates a perspective side view of tower contacting portions 484 of one pair of clamping arms of a slidable device of a crane system in accordance with another exemplary embodiment. It should be noted herein that the tower contacting portions 484 of only one pair of clamping arms are shown for ease of illustration. The crane system further includes a continuous inflatable element 402, a fluid source 404, and a fluid releasing device 406. In certain embodiments, the continuous inflatable element 402 is made of polyurethane, hypalon, or rubber material. In one embodiment, each tower contacting portion 484 includes an inner surface 408 coupled to the continuous inflatable element 402 and an outer surface 410 coupled to the one pair of clamping arms. The continuous inflatable element 402 is coupled to the fluid source 404 and the fluid releasing device 406. In certain embodiments, the fluid source 404 may be a compressor and the fluid releasing device 406 may be a valve.

During operation, the one pair of clamping arms is configured to move each tower contacting portion 484 along a lateral direction 103 to clamp each tower contacting portion 484 to the tower 400. In such an embodiment, the fluid source 404 is configured to supply a fluid to the continuous inflatable element 402 to inflate the continuous inflatable element 402 and thereby clamp each tower contacting portion 484 against the tower 400. Further, the fluid releasing device 406 is configured to release the fluid from the continuous inflatable element 402 to deflate the continuous inflatable element 402 and thereby unclamp each tower contacting portion 484 from the tower 400.

Figure 18:
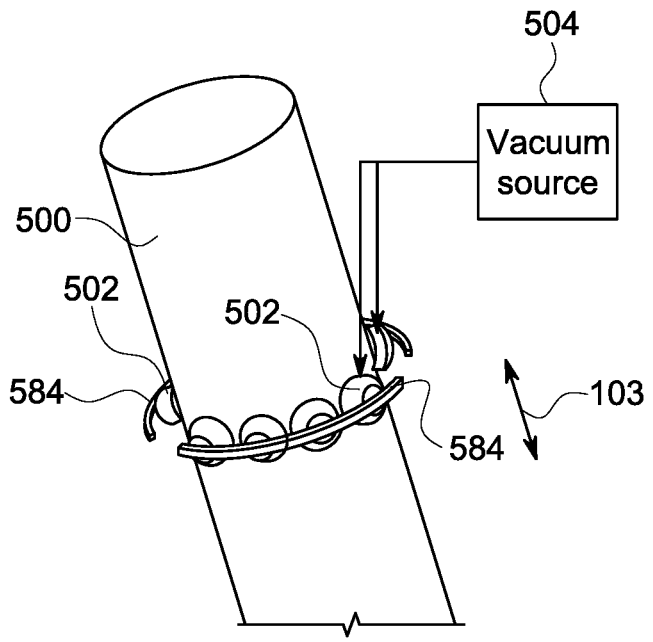
FIG. 18 is a perspective side view of tower contacting portions of one pair of clamping arms of a crane system and a portion of a tower in accordance with yet another exemplary embodiment.

FIG. 18 illustrates a perspective side view of tower contacting portions 584 of one pair of clamping arms of a slidable device of a crane system in accordance with yet another exemplary embodiment. It should be noted herein that the tower contacting portions 584 of only one pair of clamping arms are shown for ease of illustration. The crane system further includes a plurality of suction elements 502 coupled to each tower contacting portion 584 and a vacuum source 504 coupled to the plurality of suction elements 502. In certain embodiments, the plurality of suction elements 502 is made of flexible synthetic materials such as polyvinyl chloride (PVC) plastic or neoprene or rubber material.

During operation, the one pair of clamping arms is configured to move each tower contacting portion 584 along a lateral direction 103 to clamp each tower contacting portion 584 to a tower 500. In such an embodiment, the vacuum source 504 is configured to apply a suction force to the plurality of suction elements 502 to clamp the plurality of suction elements 502 to the tower 500 and thereby clamp each tower contacting portion 584 against the tower 100. Further, the vacuum source 504 is configured to release the suction force from the plurality of suction elements 502 to release the plurality of suction elements 502 from the tower 500 and thereby unclamp each tower contacting portion 584 from the tower 500.

Figure 19:
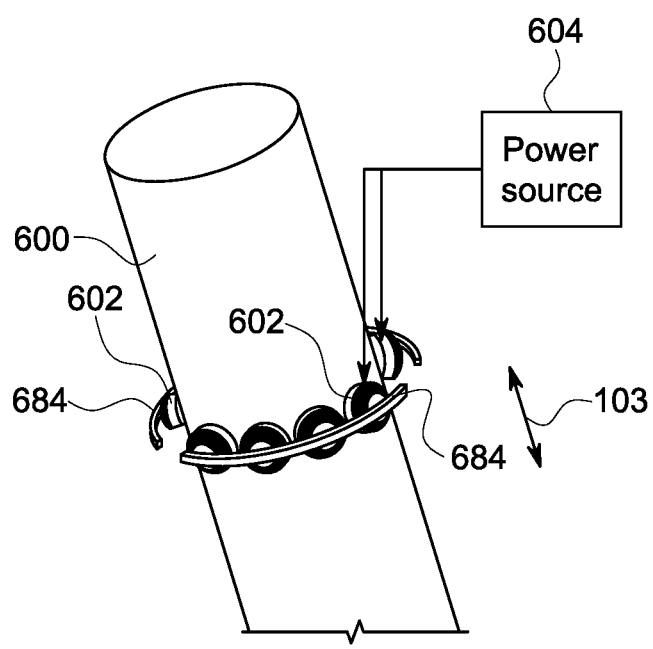
FIG. 19 is a perspective side view of tower contacting portions of one pair of clamping arms of a crane system and a portion of a tower in accordance with yet another exemplary embodiment.

FIG. 19 illustrates a perspective side view of tower contacting portions 684 of one pair of clamping arms of a slidable device of a crane system in accordance with yet another exemplary embodiment. It should be noted herein that the tower contacting portions 684 of only one pair of clamping arms are shown for ease of illustration. The crane system further includes a plurality of electromagnets 602 coupled to each tower contacting portion 684 and a power source 604 coupled to the plurality of electromagnets 602.

During operation, the one pair of clamping arms is configured to move each tower contacting portion 684 along a lateral direction 103 to clamp each tower contacting portion 684 to a tower 600. In such an embodiment, the power source 604 is configured to supply an electric power to the plurality of electromagnets 602 to magnetize the plurality of electromagnets 602, attach the plurality of electromagnets 602 to the tower and thereby clamp each tower contacting portion 684 against the tower 600. Further, the power source 604 is configured to switch off the supply of the electric power to the plurality of electromagnets 602 to demagnetize the plurality of electromagnets 602, detach the plurality of electromagnets 602 from the tower 600 and thereby unclamp each tower contacting portion 684 from the tower 600.

Figure 20:
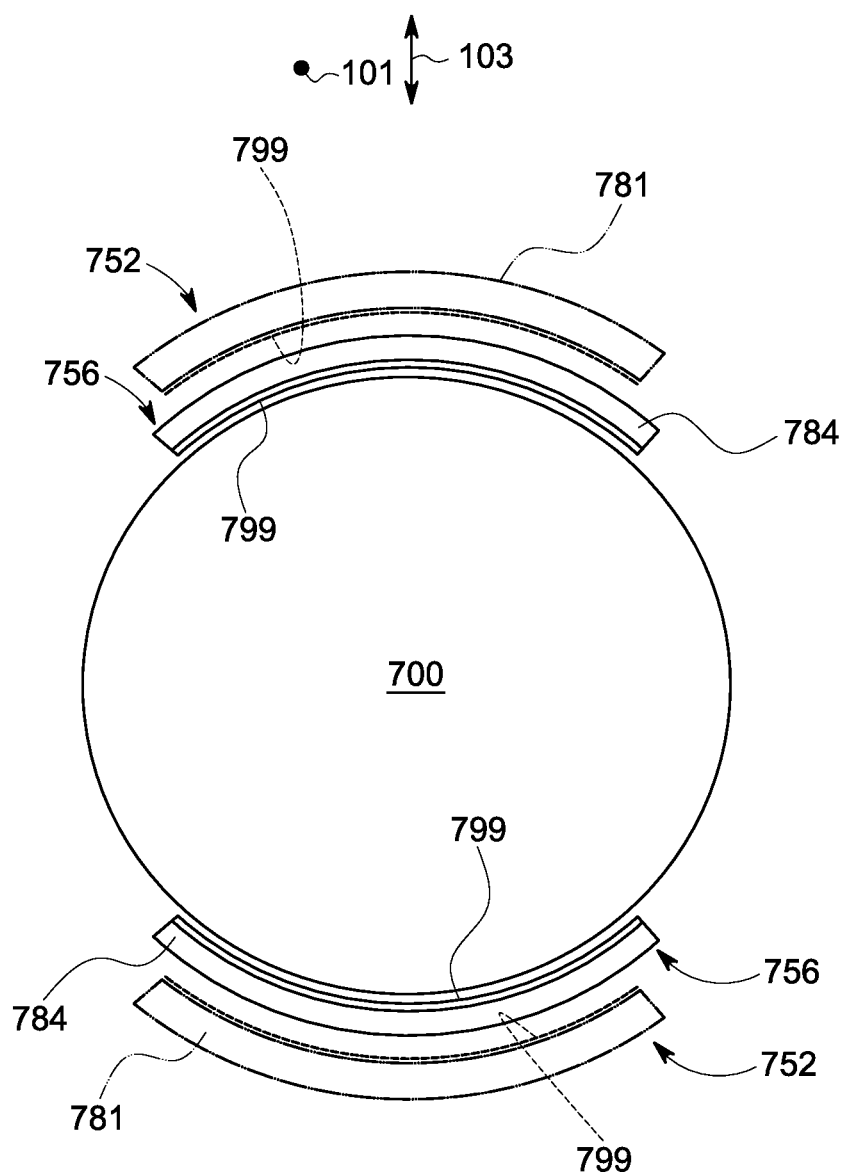
FIG. 20 is a schematic top view of a first and third pairs of clamping arms and a tower in accordance with one exemplary embodiment.

FIG. 20 is a schematic top view of a first pair of clamping arms 752 and a third pair of clamping arms 756 of a slidable device of a crane system in accordance with yet another exemplary embodiment. The second pair of clamping arms and the fourth pair of clamping arms are not shown for ease of illustration. In one embodiment, crane system further includes a plurality of rubber paddings 799 coupled to corresponding tower contacting portions 781, 784 of the first pair of clamping arms 752 and the third pair of clamping arms 756.

During operation, the plurality of rubber paddings 799 is configured to provide additional support/ grip for the tower contacting portions 781, 784 to clamp a tower 700. In the illustrated embodiment, the first pair of clamping arms 752 is moved along a lateral direction 103 to unclamp from the tower 700 and move along the longitudinal direction 101 to move the slidable device along the tower. Similarly, the third pair of clamping arms 756 is moved along the lateral direction 103 to clamp the tower 700 while the first pair of clamping arms 752 is moved along the longitudinal direction 101.

Figure 21:
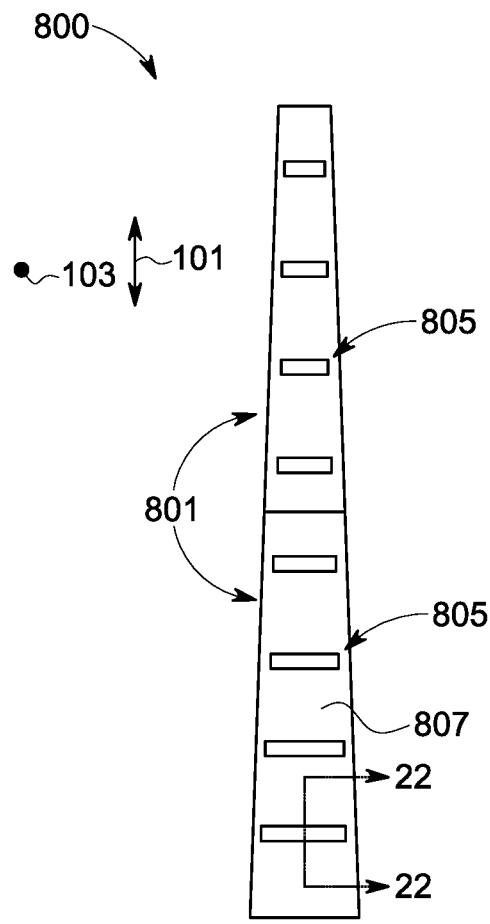
FIG. 21 is a schematic side view of a tower in accordance with one exemplary embodiment.

FIG. 21 is a schematic side view of a tower 800 in accordance with one exemplary embodiment. In one embodiment, the tower 800 is a concrete tower. The tower 800 includes a plurality of grooves 805. Specifically, each of the plurality of segments 801 of the tower 800 includes the plurality of grooves 805. The grooves 805 are spaced apart from each other and disposed on an outer surface 807 of the tower 800. The plurality of grooves 805 is disposed along a longitudinal direction 101 of the tower 800.

Figure 22:
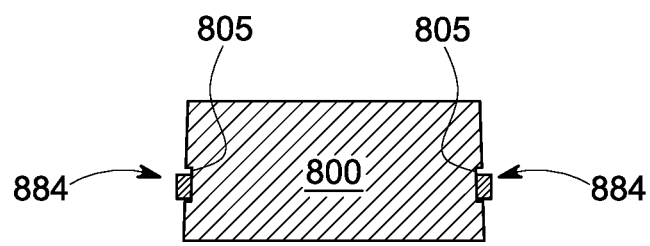
FIG. 22 is a schematic cross-section view of the tower taken along line 22-22 of FIG. 21 in accordance with one exemplary embodiment.

FIG. 22 is a schematic cross-section view of the tower 800 taken along line 22-22 of FIG. 21 in accordance with one exemplary embodiment. During operation, for example, each arm of a pair of clamping arms 884 is engaged to the corresponding groove of the plurality of grooves 805 to clamp a slidable device to the tower 800. In one embodiment, the plurality of grooves 805 assists the slidable device to grip against the tower 800 and avoid slipping of the crane system.

Figure 23:
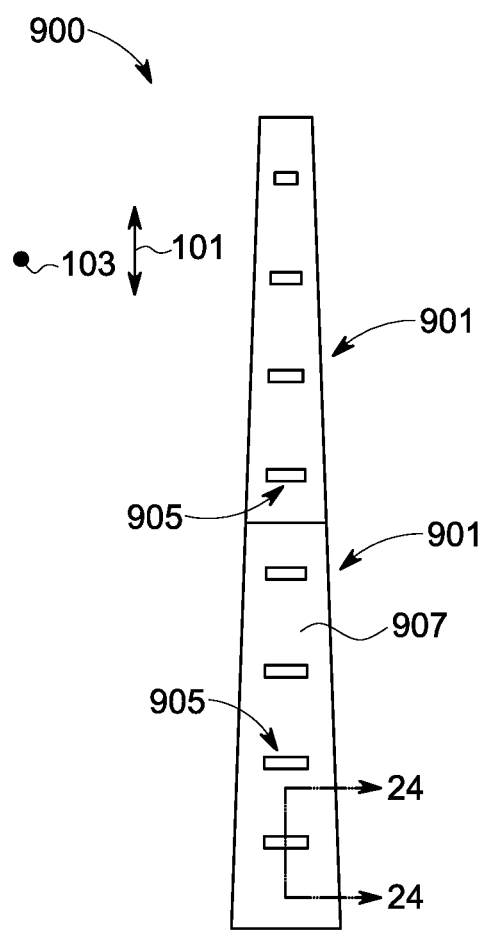
FIG. 23 is a schematic side view of a tower in accordance with another exemplary embodiment.

FIG. 23 is a schematic side view of a tower 900 in accordance with one exemplary embodiment. In one embodiment, the tower 900 is a steel tower. Specifically, each of the plurality of segments 901 of the tower 900 includes the plurality of projections 905. The projections 905 are spaced apart from each other and disposed on an outer surface 907 of the tower 900. The plurality of projections 905 is disposed along a longitudinal direction 101 of the tower 900.

Figure 24:
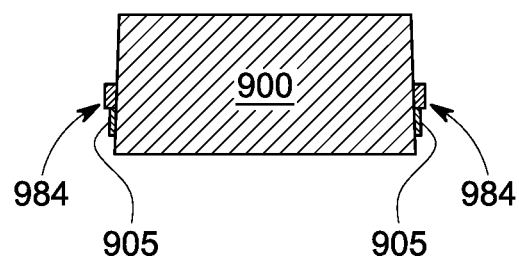
FIG. 24 is a schematic cross-section view of the tower taken along line 24-24 of FIG. 23 in accordance with another exemplary embodiment.

FIG. 24 is a schematic cross-section view of the tower 900 taken along line 24-24 of FIG. 23 in accordance with one exemplary embodiment. During operation, each clamping arm of a pair of clamping arms 984 is engaged with the corresponding projection of the plurality of projection 905 to clamp the slidable device to the tower 900. In one embodiment, the plurality of projections 905 allows the slidable device to grip against the tower 900 and avoid slippage of a crane system.

In accordance with one or more embodiments discussed herein, a slidable device of a crane system may be easily clamped or unclamped from a tower for repairing one or more components of a wind turbine or for installation of the wind turbine. The clamping arms of the slidable device are able to clamp the crane system to the tower and lift the one or more components of the wind turbine. Further, the plurality of projections or grooves of the tower provides necessary support for the slidable device to grip against the tower and avoid slippage of the crane system.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A crane system comprising:
a support structure;
a movable structure coupled to an end of the support structure and configured to move one or more components of a wind turbine;
a slidable device comprising:
  a base coupled to a peripheral side of the support structure;
  a retention component coupled to either side of the base to define a channel between the retention component and the base;
  a first pair of clamping arms and a second pair of clamping arms spaced apart and coupled to each other and to the base; and
  a third pair of clamping arms and a fourth pair of clamping arms spaced apart and coupled to each other, wherein the third and fourth pairs of clamping arms are slidably disposed within the channel in an interleaved manner with respect to the first and second pairs of clamping arms;
a first actuator unit coupled to the slidable device and configured to move the slidable device along a longitudinal direction of a tower of the wind turbine; and
a plurality of second actuator units coupled to the first, second, third, and fourth pairs of clamping arms, wherein each second actuator unit is configured to move the first, second, third, and fourth pairs of clamping arms along a lateral direction of the tower.

2. The crane system of claim 1, wherein each clamping arm of the first, second, third, and fourth pairs of clamping arms comprises a tower contacting portion configured to clamp the tower.

3. The crane system of claim 1, wherein the first actuator unit is coupled to the first pair of clamping arms and the third pair of clamping arms.

4. The crane system of claim 1, wherein the first actuator unit is coupled to the second pair of clamping arms and the fourth pair of clamping arms.

5. A method for operating a crane system, comprising:
moving a slidable device along a longitudinal direction of a tower of a wind turbine via a first actuator unit, wherein slidable device comprises:
  a base coupled to a peripheral side of a support structure;
  a retention component coupled to either side of the base to define a channel between the retention component and the base;
  a first pair of clamping arms and a second pair of clamping arms spaced apart and coupled to each other and to the base; and
  a third pair of clamping arms and a fourth pair of clamping arms spaced apart and coupled to each other, wherein the third and fourth pairs of clamping arms are slidably disposed within the channel in an interleaved manner with respect to the first and second pairs of clamping arms;
moving the first, second, third, and fourth pairs of clamping arms along a lateral direction of the tower via a second actuator unit of a plurality of second actuator units; and
clamping at least two pairs of the first, second, third, and fourth pairs of clamping arms to the tower.

6. The method of claim 5, further comprising unclamping the at least two pairs of the first, second, third, and fourth pairs of clamping arms from the tower.

7. The method of claim 5, wherein clamping at least two pairs of the first, second, third, and fourth pairs of clamping arms to the tower comprises clamping a tower contacting portion of each clamping arm of the at least two pairs of the first, second, third, and fourth pairs of clamping arms to the tower.

8. The method of claim 5, wherein moving the slidable device comprises moving the first and second pairs of clamping arms along the tower while the third and fourth pairs of clamping arms are clamped to the tower.

9. The method of claim 5, wherein moving the slidable device comprises sliding the third and fourth pairs of clamping arms within the channel while the first and second pairs of clamping arms are clamped to the tower.

10. The method of claim 5, wherein moving the slidable device along the tower comprises moving the slidable device along a first direction of the longitudinal direction or a second direction of the longitudinal direction opposite to the first direction.

* * * * *